(12) United States Patent
Veit et al.

(10) Patent No.: US 12,075,748 B2
(45) Date of Patent: Sep. 3, 2024

(54) APPARATUS FOR FILLING MOULDS WITH CURD OR A MIXTURE OF CURD AND MILK

(71) Applicant: SULBANA AG, Elsau (CH)

(72) Inventors: Gerhard Veit, Altenstadt/Filzingen (DE); Robert Reutlinger, Lautrach (DE)

(73) Assignee: SULBANA AG, Elsau (CH)

(*) Notice: Subject to any disclaimer, the term of this patent is extended or adjusted under 35 U.S.C. 154(b) by 953 days.

(21) Appl. No.: 16/982,369

(22) PCT Filed: Mar. 20, 2018

(86) PCT No.: PCT/EP2018/057054
§ 371 (c)(1),
(2) Date: Sep. 18, 2020

(87) PCT Pub. No.: WO2019/179609
PCT Pub. Date: Sep. 26, 2019

(65) Prior Publication Data
US 2021/0000063 A1 Jan. 7, 2021

(51) Int. Cl.
*A01J 25/13* (2006.01)
*A01J 25/00* (2006.01)
(Continued)

(52) U.S. Cl.
CPC ............. *A01J 25/13* (2013.01); *A01J 25/002* (2013.01); *A01J 25/126* (2013.01); *A01J 25/15* (2013.01); *A01J 25/123* (2013.01)

(58) Field of Classification Search
CPC .. A01J 25/13; A01J 25/15; A01J 25/12; A01J 25/123
(Continued)

(56) References Cited

U.S. PATENT DOCUMENTS 4,248,578 A * 2/1981 Worden ................. A01J 25/13
425/441
7,437,991 B1 10/2008 Leffelman

FOREIGN PATENT DOCUMENTS

DE 10 2006 020 226 A1 11/2007
EP 1 269 832 A1 1/2003
(Continued)

*Primary Examiner* — Reginald Alexander
(74) *Attorney, Agent, or Firm* — Birch, Stewart, Kolasch & Birch, LLP

(57) ABSTRACT

The invention relates to an apparatus for filling moulds with curd or a mixture of curd and milk of at least one production line having at least one trough (8) in which at least one mould (12) can be accommodated. The production line comprises: a) a loading station (3), which has a first means in order to insert the at least one mould into the at least one trough; b) a filling station (4) which has at least one feed line, by means of which curd or a mixture of curd and milk can be put into the at least one mould; c) a covering station (5), which has second means in order to lay a cover (19) onto the curd or the mixture of curd and milk put into the at least one mould; d) a pressing station (6), which has pressure application means by means of which the cover can be pressed onto the curd or the mixture of curd and milk put into the at least one mould with a predetermined pressure; e) a removal station (7), which has a third means in order to remove the at least one mould from the trough. The apparatus also has movement means, by means of which the at least one trough can be moved sequentially between the loading station, the filling station, the covering station, the pressing station, the removal station and back to the loading station of the at least one production line.

15 Claims, 6 Drawing Sheets

(51) Int. Cl.
*A01J 25/12* (2006.01)
*A01J 25/15* (2006.01)

(58) Field of Classification Search
USPC .................................................. 99/456, 452
See application file for complete search history.

(56) References Cited

FOREIGN PATENT DOCUMENTS

| | | | |
|---|---|---|---|
| GB | 2 149 640 A | 6/1985 | |
| WO | WO 92/20217 A1 | 11/1992 | |
| WO | WO-2016005308 A1 * | 1/2016 | ............ A01J 25/115 |

* cited by examiner

APPARATUS FOR FILLING MOULDS WITH CURD OR A MIXTURE OF CURD AND MILK

TECHNICAL FIELD

The invention relates to an apparatus for filling molds with curd or a mixture of curd and whey, as well as to an associated method.

PRIOR ART

Plants of this type are known from the prior art. For example, DE 10 2006 020 226 B4 (Franz Müller Gmbh) discloses a filling plant for the production of cheese as well as a method for filling a mixture of whey and curd. The mixture of whey and curd is filled from a supply container into one mold or a plurality of molds from which the whey is extracted such that a tight arrangement of the pieces of curd is created. Further whey can be forced out of the mold by impingement with a compressive force. A loading and unloading mechanism by way of which the at least one mold from a marshalling region can be inserted into a trough and be retrieved from the latter again is provided for the filling plant. The loading and unloading mechanism can be configured as a terminus station so that feeding into and feeding out of the containers can take place by way of the same side of the trough. A filling frame in which the mixture of whey and curd is filled can be lowered into each individual mold. The filling frame is permeable to whey so that the latter can readily penetrate the filling frame. Whey can be extracted from a drainage gap between the filling frame and the mold. The molds are furthermore retrievable from the trough in order for said molds to be utilized as transport means and for the content of said molds to be supplied to further process steps in the production of cheese.

However, known plants in terms of the design of the process are often subject to restrictions related to construction. There therefore continues to be a demand for an improved apparatus for filling molds with curd or a mixture of curd and whey.

DISCLOSURE OF THE INVENTION it is an object of the invention to achieve an apparatus associated to the technical field mentioned at the outset which enables a more flexible design of the process. The apparatus is in particular to enable an ideally continuous process as well as to be readily scalable.

The achievement of the object is defined by the features of claim 1. According to the invention, the apparatus for filling molds with curd or a mixture of curd and whey possesses at least one production line having at least one trough in which at least one mold can be received. The production line comprises:

a) a loading station which possesses first means for placing the at least one mold into the at least one trough;
b) a filling station which possesses at least one supply line by way of which curd or a mixture of curd and whey can be filled into the at least one mold;
c) a covering station which possesses second means for placing a cover onto the curd filled into the at least one mold, or the mixture of curd and whey filled into said mold;
d) a pressing station which possesses pressure-impingement means by way of which the cover can be pressed using a predefined force onto the curd filled into the at least one mold, or the mixture of curd and whey filled into said mold;
e) a retrieving station which possesses third means for retrieving the at least one mold from the trough.

The apparatus furthermore possesses moving means by way of which the at least one mold can be moved sequentially between the loading station, the filling station, the covering station, the pressing station, the retrieving station, and back to the loading station of the at least one production line.

Automated, flexible and continuous filling of molds with curd or a mixture of curd and whey is made possible on account of the movement of the trough in a sequential manner through the processing stations. Nevertheless, the advantage that each field mold can be assigned to a specific production batch so that the required quality control and traceability is guaranteed is maintained. On account of the use of individual stations, the apparatus can moreover be constructed in a modular manner on account of which said apparatus is easily adaptable for filling different molds and curd of different types of cheeses. Furthermore, the plant in terms of size can be scaled in an arbitrary manner, in particular by adding production lines, in order to achieve a higher production output.

A material which is created from milk coagulated by adding rennet or lactic acid is generally referred to as curd once said coagulated milk has been split. The whey is subsequently separated from the curd in order for cheese to be produced. Depending on the type of cheese to be produced, the curd is divided into small pieces of different sizes, wherein whey leaks out during the dividing procedure. Only pieces divided into coarse sizes are used for soft cheese, while finer pieces are always used for semi-hard and hard cheese.

The apparatus according to the invention is suitable for filling curd or a mixture of curd and whey into molds in which the curd or the mixture is compressed under the pressure, on account of which cheese wheels are created. The whey content in the curd can be further reduced according to requirements by the pressing. The whey is forced out of the curd during pressing.

The at least one mold which can be placed into the at least one trough can possess an arbitrary geometric shape and size. However, the shape is preferably round, quadrangular, or square. The volume of the at least one mold may vary. The at least one mold preferably has a volume which enables 25-800 kg, particularly 30-90 kg, of curd or of the mixture of curd and whey to be received. The at least one mold has an encircling wall which preferably possesses a multiplicity of perforations, the diameter of the latter being chosen such that said perforations are permeable to liquids, in particular to whey, while the curd is retained in the mold. In one embodiment, the mold can possess a base which closes off the mold on one side. The at least one mold in this embodiment is thus present as a vessel which is open on one side and into which the curd or the mixture of curd and whey can be filled. The mold is preferably made of plastics material or of stainless steel. Plastics materials which are suitable in the sector of foodstuff production are known to the person skilled in the art. Polyethylene (PE) and/or polypropylene (PP) are suitable, for example. A stainless steel of the type AISI 304 is suitable as stainless steel, for example (graded according to the system of the American Iron and Steel Institute (AISI)).

The shape and size of the trough is preferably adapted to the shape and size of the at least one mold used, wherein the latter is chosen in such a manner that the at least one mold can be placed completely into the trough. The trough is preferably made from stainless steel. The trough preferably possesses a rectangular base area having an encircling wall. The dimensions of the base area are preferably chosen in such a manner that there is space for more than one mold in the trough. The trough is particularly preferably shaped and dimensioned in such a manner that three molds can be placed into the trough. Depending on the size and the geometric shape of the at least one mold, the trough can however also be shaped and dimensioned in such a manner that more or fewer than three molds can be placed into said trough. The molds can preferably be placed successively into the trough.

The at least one production line can possess more than one trough, said troughs being disposed beside one another and/or behind one another, for example. However, the at least one production line preferably possesses exactly one trough.

The first means are configured in such a manner that said first means can place the at least one mold from a first waiting position of the loading station into the trough. A plurality of molds can be disposed at the first waiting position herein, said molds being successively placed into at least one trough by way of the first means. Alternatively however, the first means are also designed in such a manner that said first means can place more than one mold simultaneously from the first waiting position into the trough. The first means can be designed as a conveyor belt or as a manipulator, for example. The molds are placed onto the first waiting position by an operator, for example, or are conveyed onto said first waiting position by way of a conveyor installation.

The at least one mold can be filled with curd or a mixture of curd and whey by way of the filling station. To the extent that more than one mold can be placed into the trough, the filling station either possesses a number of supply lines which is adapted to the number of molds, or the supply line by way of an apparatus is displaceable in such a manner that said supply line can be successively positioned above the molds placed into the at least one trough so that all molds can be filled with the curd or the mixture of curd and whey.

The filling station preferably possesses a measuring unit which enables an ideally precise filling of the at least one mold with a predefined weight or a predefined volume of curd or a mixture of curd and whey.

In order for the mold to be filled, the apparatus possesses a suitable conveyor unit by way of which the curd or the mixture of curd and whey can be filled into the at least one mold by way of the at least one supply line. The at least one conveyor unit is preferably a pump.

The second means are preferably designed in such a manner that at least one can be moved over the at least one trough by way of said second means such that the at least one cover is positioned above the at least one mold and can be placed onto the curd or the mixture of curd and whey filled into the mold.

The pressure-impingement means are preferably designed as at least one ram which can push with a predetermined force vertically from above onto the cover, which on the curd or on the mixture of curd and whey in the at least one mold. The at least one ram herein is preferably moved in a linear manner in the vertical direction by a drive. The drive is preferably designed as a pneumatic cylinder. The drive can alternatively also be an electro-mechanical drive.

On account of the pressure impingement, the curd is pressed into the mold, on the one hand, and further whey can be pressed/squeezed out of the curd, on the other hand.

The at least one mold can be retrieved from the at least one trough by way of the third means. The retrieval of the mold takes place in the filled state, that is to say that the mold as before contains curd or a mixture of curd and whey.

The mold and the content thereof can then be subjected to further production steps, depending on the type of cheese to be produced, for example a brine bath and/or a maturing process.

In one embodiment, the loading station and the unloading station can be combined in a single multi-function station, that is to say that the loading station and the unloading station in this specific embodiment are configured as one and the same station. In this case, the at least one trough is returned from the pressing station to the loading station in order for the unloading step to be carried out. Furthermore, it can be provided in one embodiment that the loading station, the covering station, as well as the unloading station are combined in a single multi-function station. In this case, the multi-function station assumes the function of the three mentioned stations. However, the at least one production line preferably has in each case one loading station as well as one unloading station.

The moving means can be designed in an arbitrary manner. Said moving means only have to be capable of moving the at least one trough through the individual stations. The moving means can accordingly be designed as a conveyor belt, a carriage, or similar. The conveyor means are preferably designed as a rail-guided carriage. A rail-guided carriage can be particularly precisely positioned in the various stations. The carriage can possess a dedicated drive or be moved by an external drive, said external drive be mechanically connected to the carriage by way of corresponding traction means.

The apparatus furthermore possesses a controller by way of which the moving means as well as all elements of the various stations, in particular the first means, the second means, the third means, and the pressure-impingement means can be actuated. On account thereof, a fully automatic operation of the apparatus can be achieved. The controller preferably possesses input means by way of which various parameters of the apparatus can be set by an operator. The controller furthermore preferably possesses a communications interface by way of which the controller can be connected to a network. On account thereof, the apparatus can be remotely monitored or else remotely controlled by way of the network, for example from a control center within a manufacturing building. The controller preferably possesses a memory in which production procedures and production parameters for various types of cheeses are stored so that an ideally simple and rapid conversion of the apparatus can take place for filling molds with curd or a mixture of curd and whey for various types of cheeses.

The loading station, the filling station, the covering station, the pressing station, as well as the retrieval station are preferably disposed in succession in one line. On account thereof, the at least one trough has to be moved only in a linear manner, this simplifying the design embodiment of the moving means. Alternatively however, the stations can also be mutually disposed in a different manner. For example, the stations of one production line can also be disposed in a circular manner. This means that the at least one trough can be moved in a circle by the moving means, wherein the at least one trough upon completion of a full circular movement arrives back at the loading station.

The apparatus preferably possesses at least two production lines, in particular three, four, or more production lines. The production lines are preferably all of the same design. This means that the apparatus possesses two or more identical production lines. The production lines are preferably disposed beside one another. This means that the loading stations of all production lines are behind one another in a linear manner. The same applies to the further stations of the production lines. The arrangement of this type has the advantage that only one first means has to be provided for two or more loading stations, for example. This means that molds can be placed into the troughs of a plurality of production lines by way of only one first means. On account thereof, the production and maintenance costs of an apparatus can be lowered. In an analogous manner, only one second means can also be used for two or more covering stations and/or only one third means for two or more retrieval stations. In the case of an arrangement of this type it has however to be noted that troughs of two production lines cannot simultaneously be in the respective loading station, covering station, or unloading station. This means that the troughs of the production lines in this case have to be moved so as to be temporarily offset relative to one another.

The at least one trough is preferably connected to at least one line by way of which a liquid, in particular whey, can be filled into the trough or be emptied from the latter.

This enables flexible filling of the at least one trough with a liquid or with whey, or emptying of said trough. In particular, the at least one trough can be filled with whey prior to the at least one mold being filled with curd or the mixture of curd and whey. On account of the perforations of the at least one mold, the latter is first filled with whey before the curd or the mixture of curd and whey is filled into the at least one mold in the filling station. The at least one trough is preferably filled with a volume of whey which is sufficient for the at least one mold to lie completely below the whey in the trough. The filling of the curd or of the mixture of curd and whey into the at least one mold thus takes place completely below the whey, that is to say so as to be insulated from the ambient air. On account thereof, the number of air pockets within the at least one mold can be reduced. Furthermore, the hygienic conditions when filling the at least one mold are also improved. The whey is preferably emptied from the at least one trough after the at least one mold has been removed from said trough. On account thereof, the curd or the mixture of curd and whey within the at least one mold remains completely within the whey in all stations of the apparatus. Depending on the type of the cheese which is to be produced, no whey may also be filled into the at least one trough or the whey may be emptied from the at least one trough again immediately after the at least one mold has been filled.

Alternatively, other liquids can also be filled into the trough and emptied therefrom, for example a brine or similar. Which liquid is filled into the at least one trough when and how long said liquid remains in the latter can be varied as a function of the cheese to be produced with the curd.

The apparatus preferably has at least one conveyor apparatus for conveying the at least one mold to the loading station and/or the at least one cover to the covering station, as well as for preferably conveying the at least one mold filled with curd or the mixture of curd and whey away from the unloading station.

The conveyor apparatus is preferably a conveyor belt or a roller conveyor.

The retrieving station preferably possesses a rinsing apparatus by way of which the at least one trough can be rinsed upon retrieval of the at least one mold.

On account thereof, the at least one trough can be rinsed prior to be returned to the loading station, this improving hygiene. The rinsing apparatus preferably possesses a plurality of nozzles by way of which water and/or a cleaning liquid can be sprayed into the at least one trough. The rinsing apparatus can furthermore also possess mechanical cleaning elements such as, for example, rotating brushes or similar, by way of which mechanical cleaning of the at least one trough is possible.

The first means of the loading station, the second means of the covering station, and the third means of the unloading station are preferably designed as a first, second, or a third handling installation, respectively, by way of which the at least one mold can be moved in a linear manner in at least two spatial directions.

The first, the second, and/or the third handling installation preferably possesses/possess a gripping installation by way of which the handling installation can grip the at least one mold or the at least one cover. The gripping installation can comprise suction cups, for example, by way of which the at least one mold can be gripped by way of a vacuum. However, the gripping installation preferably has at least one mechanical gripper which can grip the at least one mold by way of a force fit or a form fit. The gripper is preferably moved in a pneumatic or electromechanical manner.

The first, the second, and/or the third handling installation are/is preferably movable in the vertical spatial direction and in a horizontal spatial direction. On account thereof, the handling installations can in each case be lowered onto the at least one mold or the at least one cover at the first waiting position of the loading station, the second waiting position of the covering station, or in the at least one trough, so that the respective gripping installation can grip the at least one mold or the at least one cover. Subsequently, by a vertical movement of the respective handling installation can be raised and by way of a movement in the horizontal spatial direction positioned above the at least one trough or above a depositing position of the unloading station. On account of a further movement in the vertical direction, the at least one mold or the at least one cover can then be deposited in the at least one trough or be deposited at the depositing position.

Alternatively, the first, second, and/or third handling installation, additionally to the vertical spatial direction, can also be movable in two horizontal spatial directions, wherein the two horizontal spatial directions are preferably at an angle of 90° relative to one another. For example, molds which stand behind one another as well as beside one another at the first waiting position of the loading station can be gripped, or molds can be placed beside one another as well as behind one another at the depositing position of the unloading station, respectively. Furthermore, the handling installations or the gripping installation thereof can also be configured in such a manner that said handling installations or said gripping installation can rotate a gripped mold or cover about at least one axis.

The handling installations preferably possess at least one pneumatic and/or electromechanical drive.

The filling station preferably possesses at least one filling element which is movable in a linear manner at least in the vertical direction. The filling element possesses a hood which by a movement in the vertical direction can be lowered onto the at least one trough, wherein the at least one supply line is disposed within the hood.

It is ensured on account thereof, that the hood of the at least one filling element as well is the at least one trough form an at least partially closed casing when the at least one mold is being filled. This prevents a potential ingress of foreign matter into the at least one mold during the filling procedure. Furthermore, the further elements of the filling station are also protected against splashes. The hygienic conditions during the filling procedure can be enhanced on account thereof.

The at least one filling element is preferably additionally movable in a horizontal direction such that a plurality of molds which are placed behind one another in the at least one trough can also be filled with curd or with the mixture of curd and whey by the at least one filling element.

The at least one filling element preferably possesses at least one pneumatic and/or electromechanical drive by way of which the filling element can be moved in a linear manner at least in the vertical spatial direction.

The apparatus for each production line preferably possesses at least one first tank for curd or a mixture of curd and whey, as well as at least one second tank for a liquid, in particular for whey.

The at least one first tank and the at least one second tank are in particular connected to corresponding storage tanks by way of lines. In this case, the at least one first tank as well as the at least one second tank act as buffers between the storage tanks as well is the respective production line. The size of the at least one first tank herein is chosen in such a manner that all molds which are placed in the at least one trough of the respective production line can be filled with curd or the mixture of curd and whey using the content of the first tank. Furthermore, the size of the at least one second tank is chosen in such a manner that the at least one trough of the respective production line can be filled with a liquid, in particular whey, using the content of the second tank.

The at least one first tank is preferably fluidically connected to the filling station of the at least one production line by way of a first line. If required, this first line can be assigned a pump by way of which the curd or the mixture of curd and whey can be conveyed from the at least one first tank to the filling station of the at least one production line.

The at least one second tank is preferably connected to the at least one trough of the at least one production line by way of the at least one line. The at least one line is preferably assigned at least one pump by way of which the liquid, in particular the whey, can be conveyed from the at least one second tank into the at least one trough.

Should the apparatus possess at least two production lines, the apparatus preferably comprises a controller which controls the moving means of each production line in such a manner that the at least one trough of a production line can be moved sequentially between the loading station, the filling station, the covering station, the pressing station, the retrieving station, and back to the loading station of the at least one production line so as to be offset by at least one position in relation to the at least one trough of a neighboring production line.

On account thereof, cycled filling of molds with curd or a mixture of curd and whey is possible between the production lines. This is particularly advantageous when two or more production lines use the same first and/or second handling installation.

In one preferred embodiment the loading station, the filling station, the covering station, the pressing station, and the unloading station are disposed behind one another in a linear manner. This means that all stations of a production line are disposed in one line. Should the apparatus possess more than one production line, the individual production lines are disposed so as to be in parallel beside one another.

The loading station, the covering station, and the unloading station are preferably combined in one multi-function station. Alternatively preferably, only the loading station and the unloading station can also be combined in the multi-function station. The multi-function station herein assumes all functions of the respective stations. This means that the three, or two, respectively, separate stations in the production line replaced by the multi-function station.

The present application furthermore relates to an assembly comprising an apparatus according to the description above, as well as at least one mold for filling with curd or a mixture of curd and whey. The mold possesses at least one encircling wall with perforations which are designed in such a manner that said perforations permit liquid, in particular whey, to pass through the wall but retain curd within the mold.

The assembly preferably comprises more than one mold. The at least one trough of the at least one production line is particularly preferably shaped and dimensioned in such a manner that three molds can be placed into the at least one trough. The at least one mold is preferably configured in such a manner that said mold can be filled with 25-800 kg, particularly 30-90 kg, of curd or the mixture of curd and whey.

The present application furthermore relates to a method for filling molds with curd or a mixture of curd and whey, in particular by way of an apparatus described above, comprising the following method steps:

a) placing at least one mold into at least one trough in at least one production line for an apparatus by way of first means of a loading station of the at least one production line;
b) moving the at least one trough from the loading station to a filling station of the at least one production line;
c) filling the at least one mold with curd or a mixture of curd and whey by way of at least one supply line of the filling station;
d) moving the at least one trough from the filling station to a covering station of the at least one production line;
e) placing a cover onto the curd or a mixture of curd and whey filled into the at least one mold by way of second means of the covering station;
f) moving the at least one trough from the filling station to a pressing station of the at least one production line;
g) compressing the cover with a predetermined pressure onto the curd filled into the at least one trough by way of pressure-impingement means of the pressing station;
h) moving the at least one trough from the pressing station to a retrieving station of the at least one production line;
i) retrieving the at least one mold from the at least one trough by way of third means of the retrieving station;
j) moving the at least one trough back to the loading station.

The method is preferably carried out using at least two production lines, wherein a controller controls the movement of the at least one trough of each production line in such a manner that the sequential movement of the at least one trough of the first production line through all stations takes place so as to be offset by at least one position, preferably two positions, in relation to the movement of the at least one trough of a second production line which neighbors the first production line.

Further advantageous embodiments and combinations of features of the invention are derived from the detailed description hereunder and from the entirety of the patent claims.

BRIEF DESCRIPTION OF THE DRAWINGS

In the drawings used for explaining the exemplary embodiment.

In principle, the same parts are provided with the same reference signs in the figures.

EMBODIMENTS OF THE INVENTION

Figure 1:
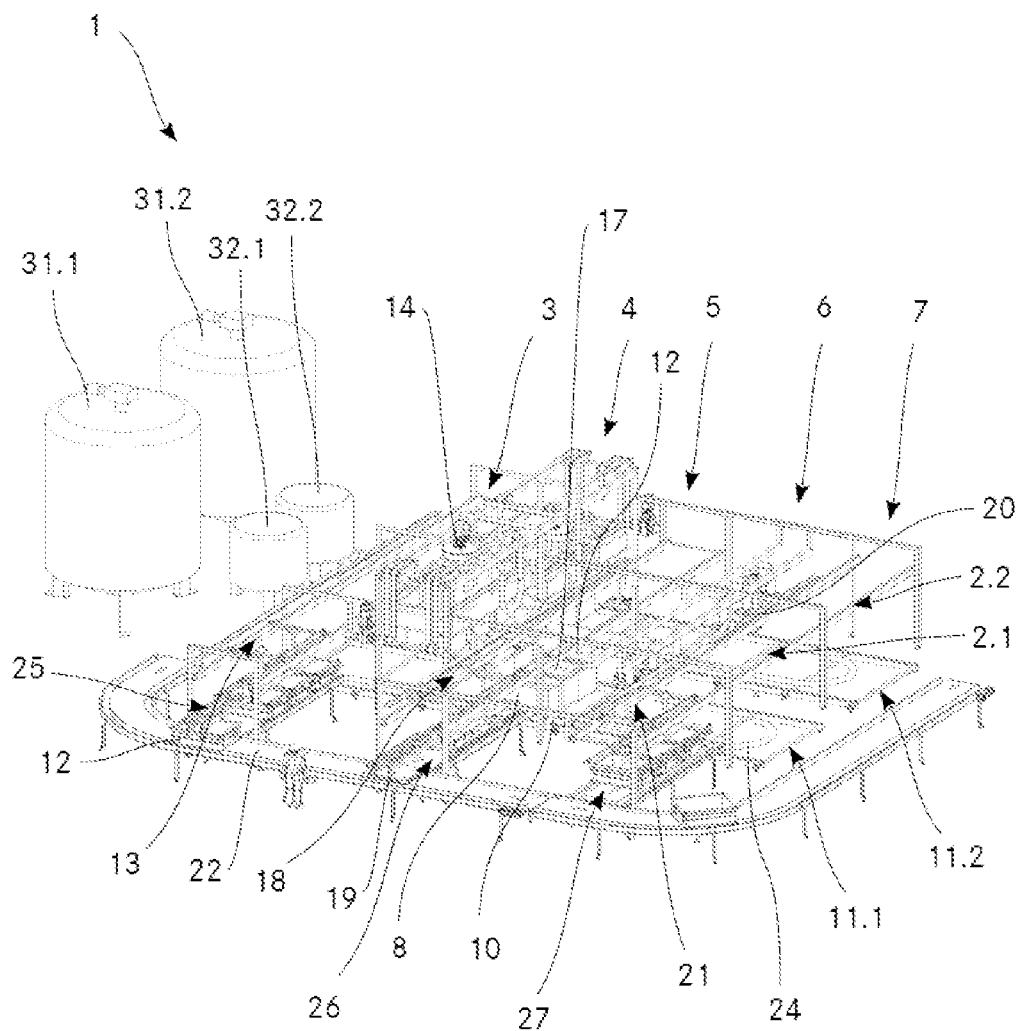
FIG. 1 shows a schematic three-dimensional view of an apparatus according to the invention.
Figure 2:
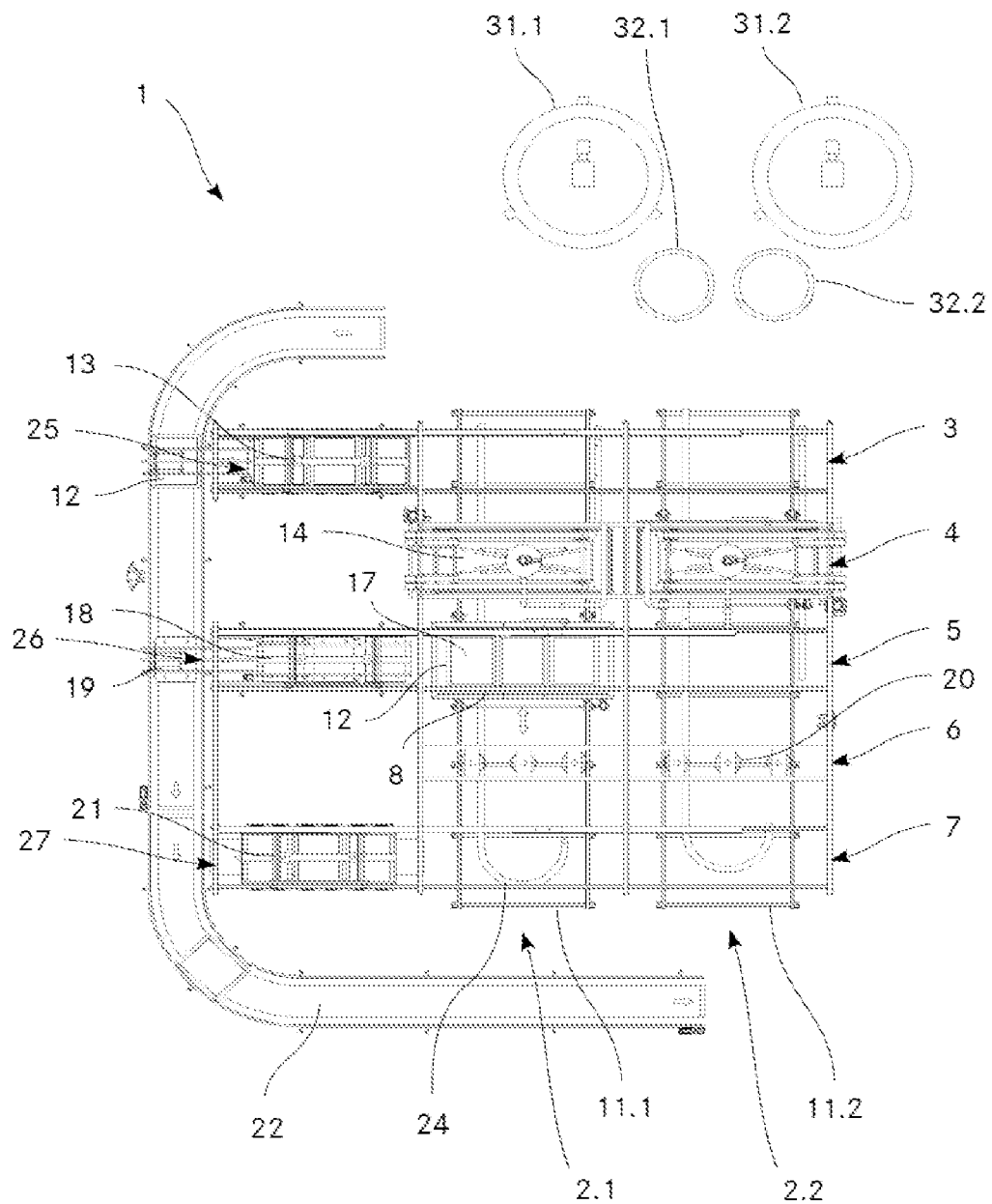
FIG. 2 shows the apparatus of FIG. 1 viewed from above.

FIGS. 1 and 2 show general layouts of an apparatus 1 according to the invention. While FIG. 1 shows a schematic three-dimensional view of the apparatus 1 according to the invention, the apparatus 1 can be seen from above in FIG. 2. The apparatus 1 of the embodiment shown comprises two production lines 2.1, 2.2 which are disposed beside one another. For illustrative purposes, individual elements of the production lines 2.1, 2.2 are only shown in the case of one production line 2.1, 2.2; however, both production lines in the example shown are of identical embodiment.

Each production line 2.1, 2.2 possesses a loading station 3, a filling station 4, a covering station 5, a pressing station 6, and an unloading station 7. One trough 8 per production line 2.1, 2.2 can be moved between the individual stations by way of a moving means which in the embodiment shown is composed of a carriage 10 which runs on rail guides. Molds 12 can be placed in the trough. The molds 12 herein are transported to a first waiting position 25 of the loading station 3 by a conveyor belt 22. The loading station 3 possesses a first handling installation 13 which can acquire one mold 12 or a plurality of molds 12 and placed said mold/molds 12 into the trough 8. The first handling installation 13 in the embodiment shown is designed as a gantry loader which can place molds 12 into the troughs of both production lines 2.1, 2.2. The first handling installation 13 herein is designed in such a manner that said handling installation 13 can move a gripping element which can grip one mold 12 or a plurality of molds 12 in the vertical direction as well as in a horizontal direction. The complexity of the apparatus 1 as well as the production costs thereof can be lowered on account of the use of the first handling installation 13 for both production lines 2.1, 2.2. Alternatively, it is of course possible for a dedicated first handling installation 13 to be provided for each of the production lines 2.1, 2.2. In the embodiment shown, the troughs 8 of both production lines 2.1, 2.2 are dimensioned in such a manner that said troughs 8 can receive three molds 12.

The filling station 4 possesses a filling element 14 which can moved in the vertical direction such that the filling element 14 can be lowered onto the molds 12 placed in the trough 8 for the filling procedure and subsequently be raised again. The filling element possesses one supply line or a plurality of supply lines by which curd 13 or a mixture of curd and whey can be filled into the molds 12 situated in the trough 8. In the embodiment shown, each of the production lines 2.1, 2.2 possesses a dedicated filling element 14. Alternatively however, the apparatus 1 could possess only one filling element 14 which by suitable means is displaceable between the two production lines 2.1 2.2. Each filling element 14 is connected to a first tank 31.1, 31.2 which is filled with the curd, or the mixture of curd and whey, respectively.

The covering station 5 possesses a second handling installation 18 by way of which covers 19 which by the conveyor belt 22 are conveyed to a second waiting position 26 of the covering station 5 can be placed onto the curd 13 or the mixture of curd and whey situated in the molds 12. Here, one cover 19 per mold 12 placed in the trough 8 is in each case placed on top by the second handling installation 18. The apparatus 1 again possesses only one second handling installation 18 by way of which covers 19 for both production lines 2.1, 2.2 can be gripped and placed into the molds 12. The second handling installation 18 is designed as a gantry loader which possesses second gripping means. The second gripping means can be moved in the vertical direction as well as in a horizontal direction by the gantry loader such that one cover 19 or a plurality of covers 19 can be gripped and placed into the molds 12 situated in the trough 8.

The pressing station 6 possesses plurality of rams 20 which by a pneumatic or electromechanical drive can be moved in the vertical direction and by way of a predefined pressure be pushed onto the covers 19.

The unloading station 7 possesses a third handing installation 21 by way of which the molds 12 incorporated in the trough 8 and filled with curd 13 or a mixture of curd and whey can be conveyed to an unloading position 27. The filled molds 12 can subsequently be transported away by the conveyor belt 22. The third handing installation 21 is again designed as a gantry loader which can move gripping elements in the vertical direction as well as in a horizontal direction such that the molds 12 situated in the trough 8 can be gripped and placed onto the unloading position 27.

Each production line 2.1, 2.2 possesses a line 24 by way of which a liquid, in particular whey, can be filled into the respective trough 8 as well as be emptied therefrom. Each line 24 is connected to a second tank 32.1, 32.2 which contains the liquid or the whey, respectively.

The functional mode of the individual stations as well as the method will be explained in more detail in FIGS. 2 to 6 hereunder.

Figure 3:
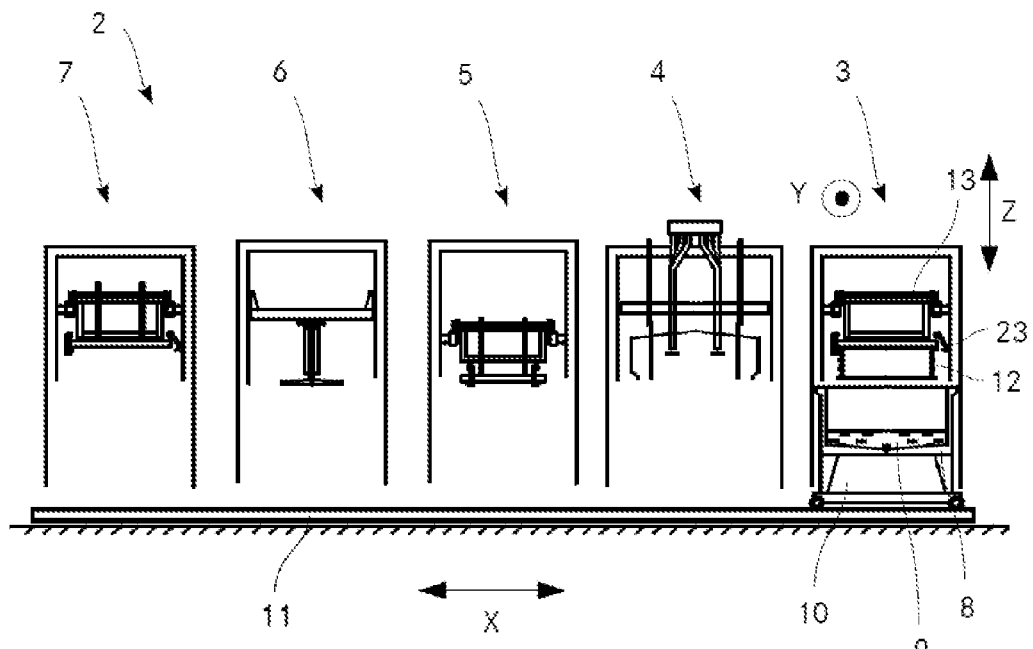
FIG. 3 shows a schematic sectional image a production line, as well as the first step of the method.

FIG. 3 shows a schematic sectional image of a production line 2 of an apparatus 1 according to the invention. The trough 8 in FIG. 3 is situated in the loading station 3. The trough 8 is filled with a defined quantity of whey 9, wherein the trough 8 can be filled with the whey by way of the line 24 (cf. FIGS. 1/2). The trough 8 is disposed on a carriage 10 which on a rail guide 11 can be moved in a linear manner to either side in the horizontal spatial direction X. The carriage 10 accordingly possesses a suitable drive, for example an electric motor (not shown). The first handling installation 13 is positioned above the trough 9 and possesses first gripping means 23 which are movable in such a manner that said gripping means 23 can be pivoted between a closed position, in which the first gripping means 23 can establish a form-fitting connection to a mold 12, and an open position. The first gripping means 23 in FIG. 3 are situated in the closed position so that a mold 12 is gripped by the first handling installation 13. The first handing apparatus 13 is designed as a gantry loader by way of which the first gripping means 23, and thus a mold 12 gripped by the latter, can be moved in the vertical direction Z as well as in the horizontal direction Y. The horizontal direction Y herein, when viewed in the direction of the observer, is perpendicular to the sheet.

In the first step of the method, by way of the first handling installation 13, a mold 12 at the first waiting position 25 (cf. FIGS. 1/2) is gripped by positioning the first gripping means 23 above the mold, lowering said gripping means 23 onto the mold, and transferring the first gripping means 23 from the open position to the closed position. By means of subsequent movements of the first gripping means 23 upward in the vertical spatial direction X, a movement in the horizontal direction Y above the trough 8, a lowering and a movement of the first gripping means 23 into the open position, the mold 12 is placed into the trough 8. This sequence of movements is repeated depending on the number of the molds 12 to be placed in.

In the second step of the method, the carriage 10 having the trough 8 is subsequently moved on the rail guide to the filling station 9.

Figure 4:
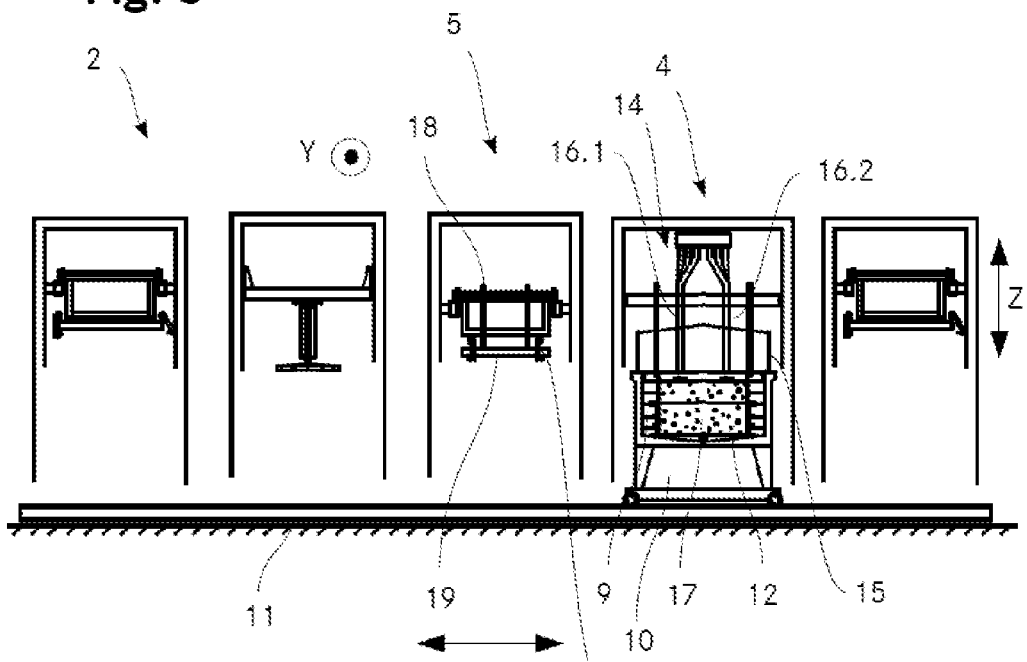
FIG. 4 shows the sectional image of FIG. 3, wherein the trough is situated in the filling station, corresponding to the third step of the method.

The trough 8 in FIG. 4 is situated in the filling station 4. The carriage 10 is positioned in the filling station 4 in such a manner that the filling element 14 comes to stop above the trough 8 and so as to be aligned with the latter. The filling element 14 possesses a hood 15 which is dimensioned and shaped in such a manner that said hood 15 in a matching manner contacts an internal wall of the trough 8. Supply lines, of which two supply lines 16.1, 16.2 can be seen in the sectional image of FIG. 3, are disposed within the hood 15.

FIG. 4 simultaneously shows the third step of the method according to the invention, in which the filling element 14 is lowered in the vertical direction such that the hood 15 contacts the internal wall of the trough 8. The trough 8 and the hood 14 herein form and at least partially closed casing. Curd 17 or a mixture of curd and whey can be filled into the mold 12 by way of the supply lines 16.1, 16.2. The filling element 14 is attracted again after the filling procedure, and the trough 8 in the fourth step of the method is moved from the filling station 4 to the covering station 5 by the carriage 10.

The covering station 5 possesses a second handling installation 18 by way of which second gripping means 28 can be moved in the vertical spatial direction Z as well as in the horizontal spatial direction Y. The second gripping means 28 are designed in such a manner that one cover 19 or a plurality of covers 19 can be releasably gripped by said second gripping means 28.

Figure 5:
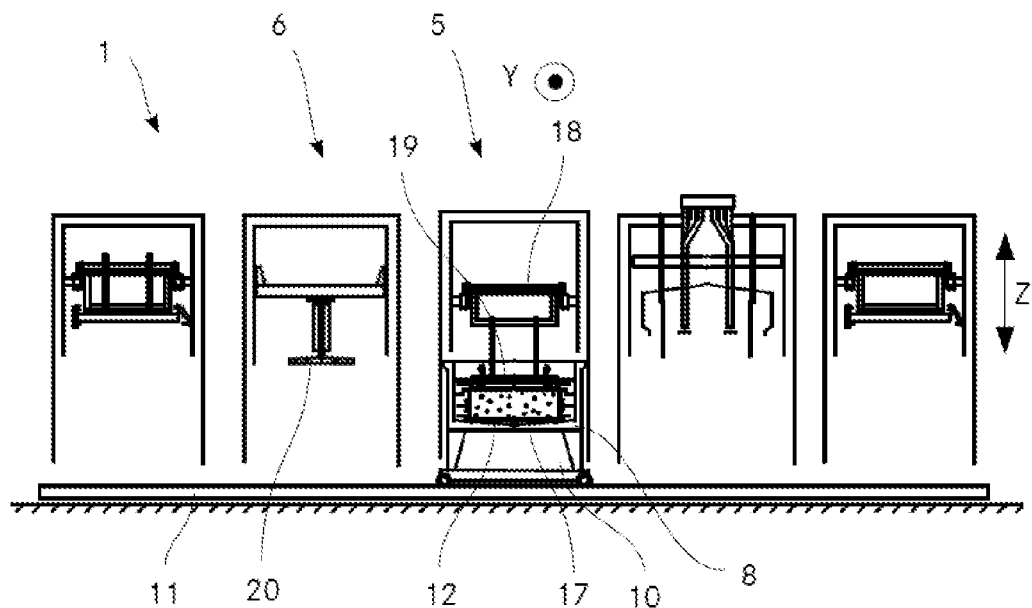
FIG. 5 shows the sectional image of FIG. 3, wherein the trough is situated in the covering station, corresponding to the fifth step of the method.

FIG. 5 shows the fifth step of the method according to the invention, in which, by way of the second handling installation 18 of the covering station 5, one cover 19 or a plurality of covers 19 can be gripped from the second waiting position 26, lowered onto the mold(s) 12 incorporated within the trough 8, and placed onto the curd 17 or the mixture of curd and whey filled within the mold(s) 12. After the placement of the one cover 19 or the plurality of covers 19, the second gripping means 28 are released from the one cover 19 or the plurality of covers 19 and moved upward in the vertical spatial direction Z. Should in each case only a single cover 19 be able to be gripped by way of the second gripping means 28, then in the fifth step of the method, successively for each mold 12 placed in the trough 8, one cover 19 is gripped from the second waiting position 26 by the second handling installation 18, is positioned above the respective mold 12 and is lowered.

In the six step of the method, the trough 8 is moved from the covering station 5 to the pressing station 6 by way of the carriage 10.

The pressing station 6 possesses a plurality of rams 20 of which only one ram 20 can be seen in the sectional illustration. The rams 20 can be moved in the vertical direction Z by way of a pneumatic or electromechanical drive (not shown). The pressing station 6 possesses at least one ram 20 for each mold 12 placed in the trough 8.

Figure 6:
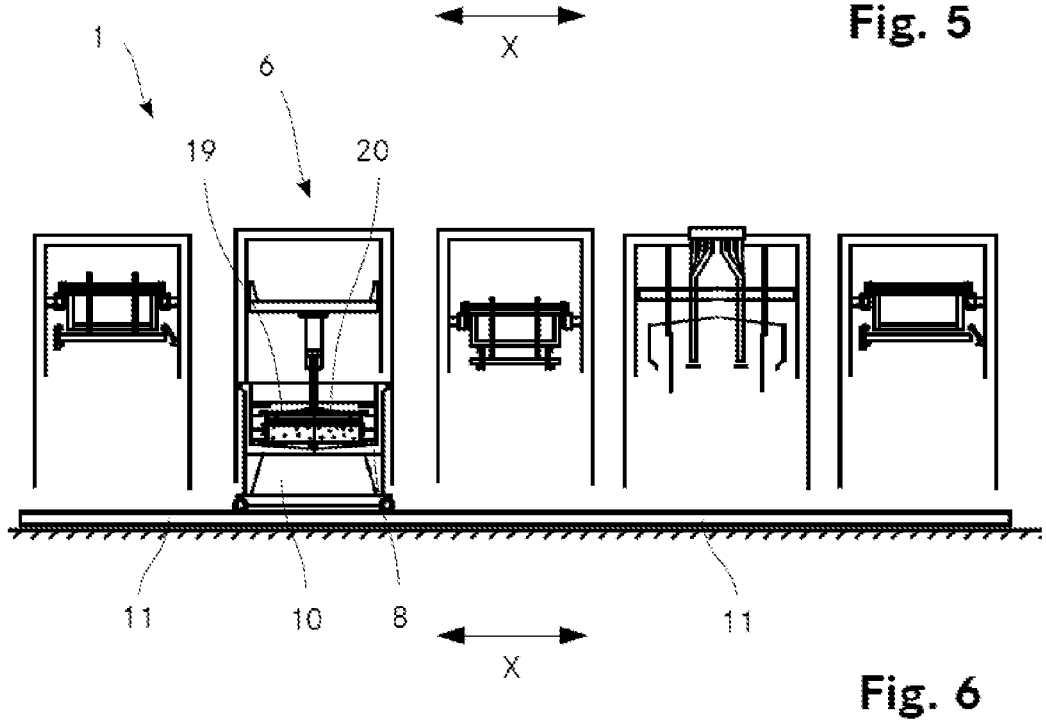
FIG. 6 shows the sectional image of FIG. 3, wherein the trough is situated in the pressing station, corresponding to the seventh step of the method.

FIG. 6 shows the seventh step of the method according to the invention. In this step, the rams 20 of the pressing station 6 are lowered onto the covers 19 of the mold(s) 12 situated in the trough 8 and by way of a predetermined force are pushed onto said covers 19 for a predetermined time. On account thereof, the curd 17 or the mixture of curd and whey situated within the mold(s) is pressed into the mold, and whey is squeezed out of the curd 17 or the mixture of curd and whey. To this end, the mold 12 or the molds 12 possesses/possess perforations through which the whey can leak out. The pressing preferably takes place by way of a constant predefined force. Alternatively, the force can also be varied in the temporal profile. After the pressing, the rams 20 are moved in the vertical direction.

In the eighth step of the method, the trough 8 is moved along the rail guide 11 from the pressing station 6 to the unloading station 7 by way of the carriage 10.

Figure 7:
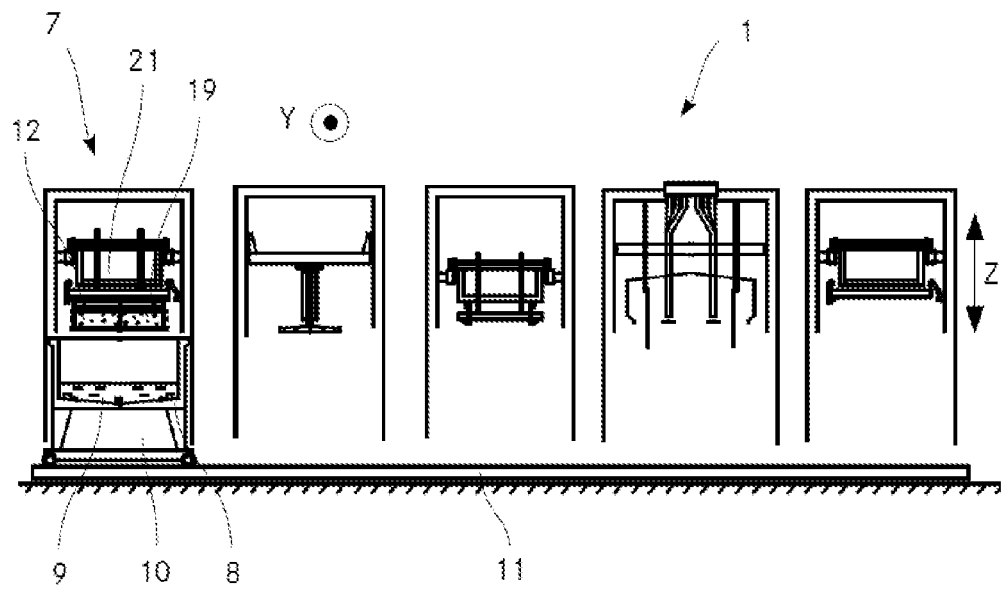
FIG. 7 shows the sectional image of FIG. 3, wherein the trough is situated in the retrieving station, corresponding to the ninth step of the method.

FIG. 7 shows the ninth step of the method according to the invention, in which the mold(s) 12 situated within the trough 8 are gripped by the third handling installation 21, which possesses third gripping means 29, are raised in the vertical direction Z, moved in the horizontal direction Y, and subsequently placed in the vertical direction Z onto the depositing position 27. Depending on how many molds 12 can be simultaneously gripped by the third gripping means 27, and depending on the number of molds 12 which are placed in the trough 8, these steps are repeated only once or multiple times until all molds 12 have been removed from the trough 8. The whey 9 can subsequently be emptied from the trough 8. The trough 8 can furthermore be cleaned by a rinsing apparatus 30 using a cleaning liquid.

The trough 8 by the carriage 10 is subsequently moved along the rail guide 11 to the loading station 3 so that the method can be carried out again using a new batch.

Figure 8:
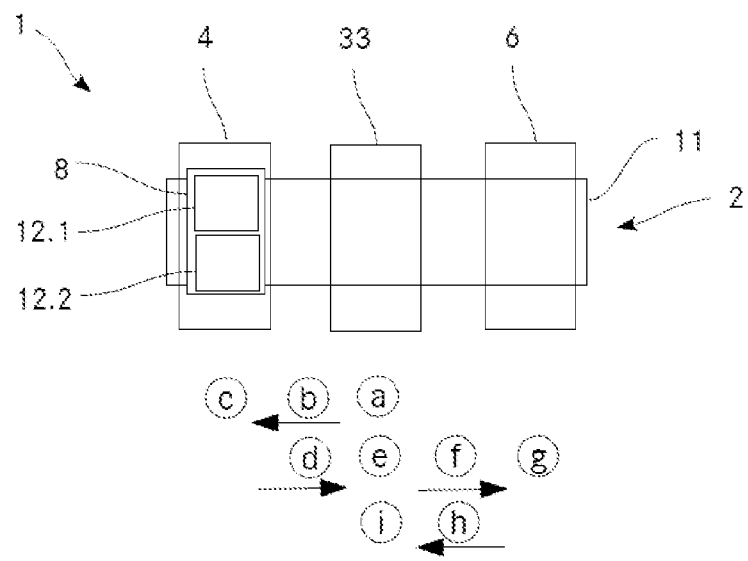
FIG. 8 shows a schematic illustration of a second embodiment of an apparatus according to the invention.

FIG. 8 shows a schematic illustration of a further embodiment of the apparatus 1 according to the invention. In this embodiment the apparatus 1 has one production line 2, wherein the loading station 3, the covering station 5, as well as the retrieving station 7 are combined. This means that a single multi-function station 33 which assumes all three functions is present instead of the loading station 3, the covering station 5, and the retrieving station 7. To this end, the multi-function station 33 possesses a manipulator which assumes the functions of the first, the second, and the third handling installations.

Accordingly, in the first step a of the method according to the invention, molds 12.1, 12.2 in the multi-function station 33 are placed into the trough 8 by the manipulator of the multi-function station 33. In the second step b, the trough 8 is subsequently moved from the multi-function station 33 to the filling station 4 where the molds 12.1, 12.2 are filled with curd or the mixture of curd and whey. In the fourth step d, the trough 8 is moved back to the multi-function station 33 where, in the fifth step e, one cover is in each case placed onto the molds 12.1, 12.2 by the manipulator of the multi-function station 33. In the sixth step f, the trough 8 is then moved to the pressing station 6. After the pressing in the seventh step g, the trough 8 in the eighth step h is again moved to the multi-function stationed 33 where, in the eighth step i, the molds 12.1, 12.2 are retrieved by the manipulator of the multi-function station 33. The cycle of the method steps subsequently recommences, wherein the trough 8, as opposed to the embodiment of FIGS. 1 to 7, does not have to be moved from the unloading station to the loading station but can remain in the multi-function station 33.

Figure 9:
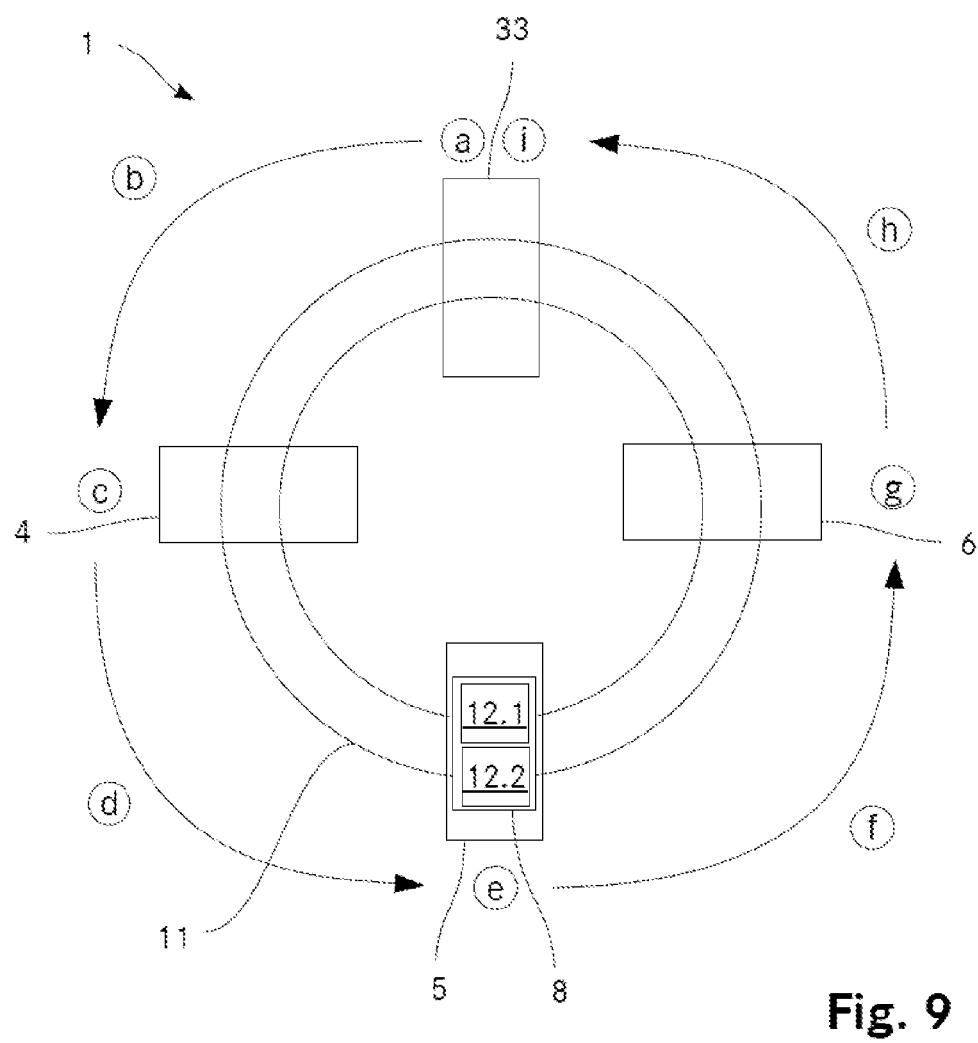
FIG. 9 shows a schematic illustration of a third embodiment of the apparatus according to the invention.

FIG. 9 shows a schematic illustration of a further embodiment of the apparatus 1 according to the invention, in which stations are disposed in a circular manner. Accordingly, the rail guide 11 describes an arc. The loading station 3 as well as the unloading station 7 are combined in the multi-function station 33. As opposed to the embodiment according to FIG. 8, the function of the covering station 5 in this embodiment is not assumed by the multi-function station 33.

Accordingly, in the first step a of the method according to the invention, molds 12.1, 12.2 in the multi-function station 33 are placed into the trough 8 by the manipulator of the multi-function station 33. In the second step b, the trough 8 is subsequently moved from the multi-function station 33 to the filling station 4 where the molds 12.1, 12.2 are filled with curd or the mixture of curd and whey. In the fourth step d, the trough 8 is moved to the covering station 5 where, in the fifth step e, one cover is in each case placed onto the molds 12.1, 12.2 by the second handling installation. In the sixth step f, the trough 8 is then moved to the pressing station 6. After the pressing in the seventh step g, the trough 8 in the eighth step h is moved to the multi-function station 33 where, in the eighth step i, the molds 12.1, 12.2 are retrieved by the manipulator of the multi-function station 33. The cycle of the method steps subsequently recommences, wherein the trough 8, as opposed to the embodiment of FIGS. 1 to 7, does not have to be moved from the unloading station to the loading station but can remain in the multi-function station 33.

The invention claimed is:

1. An apparatus for filling molds with curd or a mixture of curd and whey, said apparatus possessing at least one production line having at least one trough in which at least one mold can be received, wherein the production line comprises:
   a) a loading station which possesses first means for placing the at least one mold into the at least one trough;
   b) a filling station which possesses at least one supply line by way of which curd or a mixture of curd and whey can be filled into the at least one mold;
   c) a covering station which possesses second means for placing a cover onto the curd filled into the at least one mold, or the mixture of curd and whey filled into said mold;
   d) a pressing station which possesses pressure-impingement means by way of which the cover can be pressed using a predefined force onto the curd filled into the at least one mold, or the mixture of curd and whey filled into said mold;
   e) a retrieving station which possesses third means for retrieving the at least one mold from the trough;

wherein the apparatus possesses moving means by way of which the at least one trough can be moved sequentially between the loading station, the filling station, the covering station, the pressing station, the retrieving station, and back to the loading station of the at least one production line.

2. The apparatus as claimed in claim 1, wherein the apparatus possesses at least two or more production lines.

3. The apparatus as claimed in claim 1, wherein the at least one trough is connected to at least one line by way of which a liquid can be filled into the trough or emptied from the latter.

4. The apparatus as claimed in claim 1, wherein the apparatus has at least one conveyor apparatus for conveying the at least one mold to the loading station and/or the at least one cover to the covering station.

5. The apparatus as claimed in claim 1, wherein the retrieving station possesses a rinsing apparatus by way of which the at least one trough can be rinsed upon the retrieval of the at least one mold.

6. The apparatus as claimed in claim 1, wherein the first means of the loading station, the second means of the covering station, and the third means of the unloading station are designed as first, second, or third handling installations, respectively, by way of which the at least one mold or cover is able to be moved in a linear manner in at least two spatial directions.

7. The apparatus as claimed in claim 1, wherein the filling station possesses at least one filling element which is movable in a linear manner at least in the vertical direction, wherein the filling element possesses a hood which by a movement in the vertical direction can be lowered onto the at least one trough, wherein the at least one supply line is disposed within the hood.

8. The apparatus as claimed in claim 1, wherein the apparatus for each production line possesses at least one first tank for curd or a mixture of curd and whey, as well as at least one second tank for a liquid.

9. The apparatus as claimed in claim 2, wherein the apparatus possesses a controller which controls the moving means of each production line in such a manner that the at least one trough of a production line can be moved sequentially between the loading station, the filling station, the covering station, the pressing station, the retrieving station, and back to the loading station of the at least one production line so as to be offset by at least one position in relation to the at least one trough of a neighboring production line.

10. The apparatus as claimed in claim 1, wherein the loading station, the filling station, the covering station, the pressing station, and the unloading station are disposed behind one another in a linear manner.

11. The apparatus as claimed in claim 1, wherein the loading station, the covering station, and the unloading station, or the loading station and the unloading station, are combined in one multi-function station.

12. An assembly comprising an apparatus as claimed in claim 1 as well as at least one mold for filling with curd or a mixture of curd and whey, wherein the mold possesses at least one encircling wall with perforations which are designed in such a manner that said perforations permit liquid to pass through the wall but retain curd within the mold.

13. The apparatus according to claim 4, wherein the at least one conveyour apparatus is for conveying the at least one mold filled with curd of the mixture of curd and whey away from the unloading station.

14. A method for filling molds with curd with an apparatus according to claim 1, comprising the following method steps:
   a) placing at least one mold into at least one trough in at least one production line of the apparatus by way of first means of a loading station of the at least one production line;
   b) moving the at least one trough from the loading station to a filling station of the at least one production line;
   c) filling the at least one mold with curd by way of at least one supply line of the filling station;
   d) moving the at least one trough from the filling station to a covering station of the at least one production line;
   e) placing a cover onto the curd filled into the at least one mold by way of second means of the covering station,
   f) moving the at least one trough from the filling station to a pressing station of the at least one production line;
   g) compressing the cover with a predetermined pressure onto the curd filled into the at least one trough by way of pressure-impingement means of the pressing station;
   h) moving the at least one trough from the pressing station to a retrieving station of the at least one production line;
   i) retrieving the at least one mold from the at least one trough by way of third means of the retrieving station;
   j) moving the at least one trough back to the loading station.

15. The method as claimed in claim 14, wherein the method is carried out using at least two production lines, wherein a controller controls the movement of the at least one trough of each production line in such a manner that the sequential movement of the at least one trough of a first production line through all stations takes place so as to be offset by at least one position, preferably two positions, in relation to the movement of the at least one trough of a second production line which neighbors the first production line.

* * * * *